(12) United States Patent
Thurber et al.

(10) Patent No.: US 7,344,574 B2
(45) Date of Patent: Mar. 18, 2008

(54) COATED ABRASIVE ARTICLE, AND METHOD OF MAKING AND USING THE SAME

(75) Inventors: Ernest L. Thurber, Somerset, WI (US); Don H. Kincaid, Hudson, WI (US); James L. McArdle, Stillwater, MN (US); Steven J. Keipert, Somerset, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 431 days.

(21) Appl. No.: 11/167,777

(22) Filed: Jun. 27, 2005

(65) Prior Publication Data

US 2006/0288647 A1 Dec. 28, 2006

(51) Int. Cl.
B24D 3/00 (2006.01)
B24D 3/28 (2006.01)

(52) U.S. Cl. .............................. 51/298; 51/295; 51/307; 51/308; 51/309; 451/28; 451/539

(58) Field of Classification Search ................. 51/307, 51/308, 309, 298, 295; 451/28, 539
See application file for complete search history.

(56) References Cited

U.S. PATENT DOCUMENTS

| | | | |
|---|---|---|---|
| 3,225,013 A | 12/1965 | Fram | |
| 3,989,610 A | 11/1976 | Tsukada et al. | |
| 4,314,827 A | 2/1982 | Leitheiser et al. | |
| 4,396,657 A | 8/1983 | Ibrahim | |
| 4,518,397 A | 5/1985 | Leitheiser et al. | |
| 4,524,181 A | 6/1985 | Adam et al. | |
| 4,588,419 A | 5/1986 | Caul et al. | |
| 4,601,973 A | 7/1986 | Bauer | |
| 4,623,364 A | 11/1986 | Cottringer et al. | |
| 4,652,275 A | 3/1987 | Bloecher et al. | |
| 4,734,104 A | 3/1988 | Broberg | |
| 4,737,163 A | 4/1988 | Larkey | |
| 4,744,802 A | 5/1988 | Schwabel | |
| 4,749,617 A | 6/1988 | Canty | |
| 4,751,138 A | 6/1988 | Tumey et al. | |
| 4,770,671 A | 9/1988 | Monroe et al. | |
| 4,799,939 A | 1/1989 | Bloecher et al. | |
| 4,833,204 A | 5/1989 | Yusa et al. | |
| 4,881,951 A | 11/1989 | Wood et al. | |
| 4,927,431 A | 5/1990 | Buchanan et al. | |
| 4,939,008 A | 7/1990 | Kemski | |
| 4,997,717 A | 3/1991 | Rembold et al. | |
| 5,011,508 A | 4/1991 | Wald et al. | |
| 5,014,468 A | 5/1991 | Ravipati et al. | |
| 5,039,311 A | 8/1991 | Bloecher | |
| 5,078,753 A | 1/1992 | Broberg et al. | |
| 5,086,088 A | 2/1992 | Kitano et al. | |
| 5,090,968 A | 2/1992 | Pellow | |
| 5,108,463 A | 4/1992 | Buchanan | |
| 5,137,542 A | 8/1992 | Buchanan et al. | |
| 5,139,978 A | 8/1992 | Wood | |
| 5,152,917 A | 10/1992 | Pieper et al. | |
| 5,178,646 A | 1/1993 | Barber, Jr. et al. | |
| 5,201,916 A | 4/1993 | Berg et al. | |
| 5,203,884 A | 4/1993 | Buchanan et al. | |
| 5,227,104 A | 7/1993 | Bauer | |
| 5,256,170 A | 10/1993 | Harmer et al. | |
| 5,304,223 A | 4/1994 | Pieper et al. | |
| 5,304,224 A | 4/1994 | Harmon | |
| 5,328,716 A | 7/1994 | Buchanan | |
| 5,360,462 A | 11/1994 | Harmer et al. | |
| 5,366,523 A | 11/1994 | Rowenhorst et al. | |
| 5,378,251 A | 1/1995 | Culler et al. | |
| 5,417,726 A | 5/1995 | Stout et al. | |
| 5,429,647 A | 7/1995 | Larmie | |
| 5,435,816 A | 7/1995 | Spurgeon et al. | |
| 5,436,063 A | 7/1995 | Follett et al. | |
| 5,451,446 A | 9/1995 | Kincaid et al. | |
| 5,490,878 A | 2/1996 | Peterson et al. | |
| 5,492,550 A | 2/1996 | Krishnan et al. | |
| 5,496,386 A | 3/1996 | Broberg et al. | |
| 5,498,269 A | 3/1996 | Larmie | |
| 5,505,747 A | 4/1996 | Chesley et al. | |
| 5,520,711 A | 5/1996 | Helmin | |
| 5,534,391 A | 7/1996 | Wang | |
| 5,549,962 A | 8/1996 | Holmes et al. | |
| 5,551,961 A | 9/1996 | Engen et al. | |
| 5,551,963 A | 9/1996 | Larmie | |

(Continued)

FOREIGN PATENT DOCUMENTS

| | | |
|---|---|---|
| GB | 2 109 798 A | 6/1983 |
| JP | 5-104449 | 4/1993 |
| WO | WO 00/13853 | 3/2000 |
| WO | WO 00/37569 A1 | 6/2000 |
| WO | WO 02/074492 A2 | 9/2002 |
| WO | WO 02/074839 A2 | 9/2002 |
| WO | WO 03/033212 A1 | 4/2003 |

OTHER PUBLICATIONS

Keipert et al., "Polymerizable Composition and Articles Therefrom", U.S. Appl. No. 10/871,451, Filed Jun. 18, 2004.
Keipert et al., "Coated Abrasive Article With Tie Layer, and Method of Making and Using the Same", U.S. Appl. No. 10/871,455, Filed Jun. 18, 2004.
Keipert et al., "Coated Abrasive Article With Composite Tie Layer, and Method of Making and Using the Same", U.S. Appl. No. 10/871,486, Filed Jun. 18, 2004.

(Continued)

Primary Examiner—Michael Marcheschi
(74) Attorney, Agent, or Firm—Bradford B. Wright

(57) ABSTRACT

A coated abrasive article has a backing treatment preparable by at least partially polymerizing an isotropic backing treatment precursor comprising polyepoxide, polyfunctional urethane (meth)acrylate, non-urethane polyfunctional (meth)acrylate, acidic free-radically polymerizable monomer, dicyandiamide, photoinitiator. Methods of making and using the same.

17 Claims, 1 Drawing Sheet

U.S. PATENT DOCUMENTS

| | | | |
|---|---|---|---|
| 5,556,437 A | 9/1996 | Lee et al. |
| 5,560,753 A | 10/1996 | Schnabel et al. |
| 5,565,011 A | 10/1996 | Follett et al. |
| 5,573,619 A | 11/1996 | Benedict et al. |
| 5,578,095 A | 11/1996 | Bland et al. |
| 5,578,343 A | 11/1996 | Gaeta et al. |
| 5,609,706 A | 3/1997 | Benedict et al. |
| 5,611,825 A | 3/1997 | Engen et al. |
| 5,643,669 A | 7/1997 | Tsuei |
| 5,667,541 A | 9/1997 | Klun et al. |
| 5,672,097 A | 9/1997 | Hoopman |
| 5,672,186 A | 9/1997 | Chesley et al. |
| 5,681,217 A | 10/1997 | Hoopman et al. |
| 5,700,302 A | 12/1997 | Stoetzel et al. |
| 5,714,259 A | 2/1998 | Holmes et al. |
| 5,754,338 A | 5/1998 | Wilson et al. |
| 5,766,277 A | 6/1998 | DeVoe et al. |
| 5,784,197 A | 7/1998 | Frey et al. |
| 5,851,247 A | 12/1998 | Stoetzel et al. |
| 5,853,632 A | 12/1998 | Bunke et al. |
| 5,855,632 A | 1/1999 | Stoetzel et al. |
| 5,863,847 A | 1/1999 | De Voe et al. |
| 5,882,796 A | 3/1999 | Wilson et al. |
| 5,913,716 A | 6/1999 | Mucci et al. |
| 5,922,784 A | 7/1999 | De Voe et al. |
| 5,932,350 A | 8/1999 | Lauer et al. |
| 5,942,015 A | 8/1999 | Culler et al. |
| 5,954,844 A | 9/1999 | Law et al. |
| 5,961,674 A | 10/1999 | Gagliardi et al. |
| 5,964,979 A | 10/1999 | George et al. |
| 5,975,988 A | 11/1999 | Christianson |
| 5,989,111 A | 11/1999 | Lamphere et al. |
| 6,001,936 A | 12/1999 | Barrera et al. |
| 6,059,850 A | 5/2000 | Lise et al. |
| 6,077,601 A | 6/2000 | DeVoe et al. |
| 6,139,594 A | 10/2000 | Kincaid et al. |
| 6,200,666 B1 | 3/2001 | Christian et al. |
| 6,217,432 B1 | 4/2001 | Woo |
| 6,228,133 B1 | 5/2001 | Thurber et al. |
| 6,234,875 B1 | 5/2001 | Pendergrass, Jr. |
| 6,239,049 B1 | 5/2001 | Follensbee et al. |
| 6,248,815 B1 | 6/2001 | Papsin et al. |
| 6,258,138 B1 * | 7/2001 | DeVoe et al. | 51/298 |
| 6,261,682 B1 | 7/2001 | Law |
| 6,277,160 B1 | 8/2001 | Stubbs et al. |
| 6,287,669 B1 | 9/2001 | George et al. |
| 6,359,027 B1 * | 3/2002 | Dahlke et al. | 522/153 |
| 6,372,336 B1 | 4/2002 | Clausen et al. |
| 6,475,253 B2 | 11/2002 | Culler et al. |
| 6,565,969 B1 | 5/2003 | Lamon et al. |
| 6,572,971 B2 | 6/2003 | Martin |
| 6,582,487 B2 | 6/2003 | Larson et al. |
| 6,605,128 B2 | 8/2003 | Larson et al. |
| 6,645,624 B2 | 11/2003 | Adefris et al. |
| 6,833,014 B2 | 12/2004 | Welygan et al. |
| 6,843,815 B1 | 1/2005 | Thurber et al. |
| 6,936,083 B2 | 8/2005 | Thurber et al. |
| 2001/0009952 A1 | 7/2001 | Tan et al. |
| 2001/0028953 A1 | 10/2001 | Bluem et al. |
| 2002/0016226 A1 | 2/2002 | Jin et al. |
| 2002/0098323 A1 | 7/2002 | Larson et al. |
| 2004/0029511 A1 | 2/2004 | Kincaid et al. |
| 2005/0060946 A1 | 3/2005 | Collins et al. |
| 2005/0060947 A1 | 3/2005 | McArdle et al. |

OTHER PUBLICATIONS

Thurber et al., "Treated Backing and Method of Making the Same", U.S. Appl. No. 11/009,179, Filed Dec. 20, 2004.

Rostal et al., "Abrasive Articles and Methods of Making and Using the Same", U.S. Appl. No. 11/135,766, Filed May 24, 2005.

Thurber et al., "Composition, Treated Backing, and Abrasive Articles Containing the Same", U.S. Appl. No. 11/167,887, Filed Jun. 27, 2005.

Oligomer Selecton Guide, Sartomer, Co., Exton, Pennsylvania, 1997, 18 pages.

Application Bulletin—Glass Transition Temperatures of Sartomer Products, Sartomer Co., Exton, Pennsylvania, Oct. 1999.

* cited by examiner

COATED ABRASIVE ARTICLE, AND METHOD OF MAKING AND USING THE SAME

BACKGROUND

In general, coated abrasive articles have abrasive particles secured to a backing. More typically, coated abrasive articles comprise a backing having two major opposed surfaces and an abrasive layer secured to one of the major surfaces. The abrasive layer is typically comprised of abrasive particles and a binder, wherein the binder serves to secure the abrasive particles to the backing.

One common type of coated abrasive article has an abrasive layer which comprises a make layer, a size layer, and abrasive particles. In making such a coated abrasive article, a make layer comprising a first binder precursor is applied to a major surface of the backing. Abrasive particles are then at least partially embedded into the make layer (e.g., by electrostatic coating), and the first binder precursor is cured (i.e., crosslinked) to secure the particles to the make layer. A size layer comprising a second binder precursor is then applied over the make layer and abrasive particles, followed by curing of the binder precursors.

Another common type of coated abrasive article comprises an abrasive layer secured to a major surface of a backing, wherein the abrasive layer is provided by applying a slurry comprised of binder precursor and abrasive particles onto a major surface of a backing, and then curing the binder precursor.

In another aspect, coated abrasive articles may further comprise a supersize layer covering the abrasive layer. The supersize layer typically includes grinding aids and/or anti-loading materials.

Optionally, backings used in coated abrasive articles may be treated with one or more applied coatings. Examples of typical backing treatments are a backsize layer (i.e., a coating on the major surface of the backing opposite the abrasive layer), a presize layer or a tie layer (i.e., a coating on the backing disposed between the abrasive layer and the backing), and/or a saturant that saturates the backing. A subsize is similar to a saturant, except that it is applied to a previously treated backing.

However, depending on the particular choice of abrasive layer and backing (treated or untreated), the abrasive layer may partially separate from the backing during abrading resulting in the release of abrasive particles. This phenomenon is known in the abrasive art as "shelling". In most cases, shelling is undesirable because it results in a loss of performance.

SUMMARY

In one aspect, the present invention provides a coated abrasive article comprising a backing having a major surface, a backing treatment secured to at least a portion of the major surface, an abrasive layer secured to at least a portion of the backing treatment, the abrasive layer comprising abrasive particles and a binder resin, wherein the backing treatment is preparable by at least partially polymerizing an isotropic backing treatment precursor comprising, based on the total weight of components a) to g):
  a) from 1 to 12 percent of at least one polyepoxide preparable by reaction of epichlorohydrin with at least one of bisphenol A or bisphenol F;
  b) from 70 to 90 percent of at least one polyfunctional urethane (meth)acrylate, wherein homopolymerization of the polyfunctional urethane (meth)acrylate results in a polymer having a glass transition temperature of less than 50 degrees Celsius;
  c) from 1 to 10 percent of at least one non-urethane polyfunctional (meth)acrylate;
  d) from 1 to 10 percent of at least one acidic free-radically polymerizable monomer;
  e) dicyandiamide;
  f) photoinitiator; and
  g) optional epoxy cure catalyst.

In one embodiment, the abrasive layer comprises a make layer comprising a first binder resin, wherein the abrasive particles are embedded in the make layer, and a size layer comprising a second binder resin secured to the make layer and the abrasive particles.

In another embodiment, the abrasive particles are dispersed in the binder resin.

In another aspect, the present invention provides a method of abrading a workpiece comprising:
  providing a coated abrasive article according to the present invention;
  frictionally contacting at least a portion of the abrasive layer with at least a portion of a surface of the workpiece; and
  moving at least one of the coated abrasive article or the workpiece relative to the other to abrade at least a portion of the surface.

In yet another aspect, the present invention provides a method of making a coated abrasive article comprising:
  disposing a backing treatment precursor on at least a portion of a backing, the backing treatment precursor comprising, based on the total weight of components a) to g):
  a) from 1 to 12 percent of at least one polyepoxide preparable by reaction of epichlorohydrin with at least one of bisphenol A or bisphenol F;
  b) from 70 to 90 percent of at least one polyfunctional urethane (meth)acrylate, wherein homopolymerization of the polyfunctional urethane (meth)acrylate results in a polymer having a glass transition temperature of less than 50 degrees Celsius;
  c) from 1 to 10 percent of at least one non-urethane polyfunctional (meth)acrylate;
  d) from 1 to 10 percent of at least one acidic free-radically polymerizable monomer;
  e) dicyandiamide;
  f) photoinitiator; and
  g) optional epoxy cure catalyst;
  at least partially polymerizing the backing treatment precursor;
  disposing a polymerizable make resin precursor on the at least partially polymerized backing treatment precursor;
  at least partially embedding abrasive particles in the make resin precursor; and
  at least partially polymerizing the make resin precursor.

In yet another aspect, the present invention provides method of making a coated abrasive article comprising disposing a backing treatment precursor on at least a portion of a backing, the backing treatment precursor comprising, based on the total weight of components a) to g):
  a) from 1 to 12 percent of at least one polyepoxide preparable by reaction of epichlorohydrin with at least one of bisphenol A or bisphenol F;
  b) from 70 to 90 percent of at least one polyfunctional urethane (meth)acrylate, wherein homopolymerization of the polyfunctional urethane (meth)acrylate results in a polymer having a glass transition temperature of less than 50 degrees Celsius;

c) from 1 to 10 percent of at least one non-urethane polyfunctional (meth)acrylate;
d) from 1 to 10 percent of at least one acidic free-radically polymerizable monomer;
e) dicyandiamide;
f) photoinitiator; and
g) optional epoxy cure catalyst; and
at least partially polymerizing the backing treatment precursor;
disposing a slurry comprising polymerizable binder precursor and abrasive particles on the at least partially polymerized backing treatment precursor; and
at least partially polymerizing the binder precursor.

Coated abrasive articles according to the present invention are typically useful for abrading a workpiece, and in at least some embodiments exhibit low levels of shelling during manufacturing and abrading processes.

As used herein:
the term "(meth)acryl" includes both "acryl" and "methacryl"; and
the term "non-urethane" means being free of

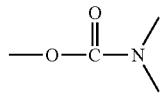

groups.

DETAILED DESCRIPTION

Figure 1:
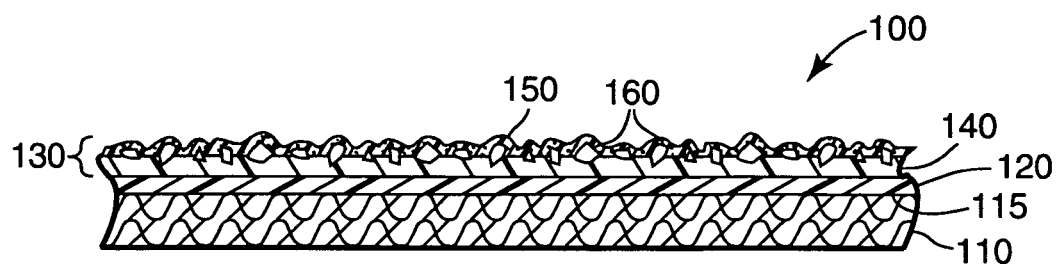
FIG. 1 is a cross-sectional view of an exemplary coated abrasive article.

Coated abrasive articles according to present invention comprise a backing having first and second major surfaces, a backing treatment secured to at least a portion of the first major surface, an abrasive layer secured to at least a portion of the backing treatment, and an abrasive layer secured to at least a portion of the backing treatment. The abrasive layer comprises abrasive particles and a binder resin. The backing treatment is preparable by at least partially polymerizing an isotropic backing treatment precursor comprising, based on the total weight of components a) to g):
a) from 1 to 12 percent of at least one polyepoxide preparable by reaction of epichlorohydrin with at least one of bisphenol A or bisphenol F;
b) from 70 to 90 percent of at least one polyfunctional urethane (meth)acrylate, wherein homopolymerization of the polyfunctional urethane (meth)acrylate results in a polymer having a glass transition temperature of less than 50 degrees Celsius;
c) from 1 to 10 percent of at least one non-urethane polyfunctional (meth)acrylate;
d) from 1 to 10 percent of at least one acidic free-radically polymerizable monomer;
e) dicyandiamide;
f) photoinitiator; and
g) optional epoxy cure catalyst.

Suitable backings include those known in the art for making coated abrasive articles. Typically, the backing has two opposed major surfaces. The thickness of the backing generally ranges from about 0.02 to about 5 millimeters, desirably from about 0.05 to about 2.5 millimeters, and more desirably from about 0.1 to about 0.4 millimeter, although thicknesses outside of these ranges may also be useful.

The backing may be flexible or rigid, and may be made of any number of various materials including those conventionally used as backings in the manufacture of coated abrasives. Examples include paper, fabric, film, polymeric foam, vulcanized fiber, woven and nonwoven materials, combinations of two or more of these materials. The backing may also be a laminate of two materials (e.g., paper/film, cloth/paper, film/cloth).

Exemplary flexible backings include polymeric film (including primed films) such as polyolefin film (e.g., polypropylene including biaxially oriented polypropylene, polyester film, polyamide film, cellulose ester film), metal foil, mesh, scrim, foam (e.g., natural sponge material or polyurethane foam), cloth (e.g., cloth made from fibers or yarns comprising polyester, nylon, silk, cotton, and/or rayon), paper, vulcanized paper, vulcanized fiber, nonwoven materials, and combinations thereof. Cloth backings may be woven or stitch bonded.

The backing may be a fibrous reinforced thermoplastic such as described, for example, as described, for example, in U.S. Pat. No. 5,417,726 (Stout et al.), or an endless spliceless belt, for example, as described, for example, in U.S. Pat. No. 5,573,619 (Benedict et al.), the disclosures of which are incorporated herein by reference. Likewise, the backing may be a polymeric substrate having hooking stems projecting therefrom such as that described, for example, in U.S. Pat. No. 5,505,747 (Chesley et al.), the disclosure of which is incorporated herein by reference. Similarly, the backing may be a loop fabric such as that described, for example, in U.S. Pat. No. 5,565,011 (Follett et al.), the disclosure of which is incorporated herein by reference.

Exemplary rigid backings include metal plates, and ceramic plates. Another example of a suitable rigid backing is described, for example, in U.S. Pat. No. 5,417,726 (Stout et al.), the disclosure of which is incorporated herein by reference.

The backing treatment may comprise a presize, subsize, saturant, or tie layer. In addition to the backing treatment preparable by at least partially polymerizing an isotropic backing treatment precursor comprising components a)-g) as described hereinabove, the backing may have one or more additional treatments (e.g., conventional treatments) applied thereto such as, for example, a presize, a backsize, a subsize, and/or a saturant. Typically, such treatments may be applied in any order. For example, a presize preparable by at least partially polymerizing an isotropic backing treatment precursor comprising components a)-g) may be applied to a backsize treated (i.e., backsized) backing. Additional details regarding backing treatments can be found in, for example, U.S. Pat. No. 5,108,463 (Buchanan et al.); U.S. Pat. No. 5,137,542 (Buchanan et al.); U.S. Pat. No. 5,328,716 (Buchanan); and U.S. Pat. No. 5,560,753 (Buchanan et al.), the disclosures of which are incorporated herein by reference.

Coated abrasive articles according to the present invention include at least one backing treatment preparable by at least partially polymerizing an isotropic backing treatment precursor comprising, based on the total weight of components a) to g):
- a) from 1 to 12 percent of at least one polyepoxide preparable by reaction of epichlorohydrin with at least one of bisphenol A or bisphenol F;
- b) from 70 to 90 percent of at least one polyfunctional urethane (meth)acrylate, wherein homopolymerization of the polyfunctional urethane (meth)acrylate results in a polymer having a glass transition temperature of less than 50 degrees Celsius;
- c) from 1 to 10 percent of at least one non-urethane polyfunctional (meth)acrylate;
- d) from 1 to 10 percent of at least one acidic free-radically polymerizable monomer;
- e) dicyandiamide;
- f) photoinitiator; and
- g) optional epoxy cure catalyst.

Useful polyepoxides preparable by reaction of epichlorohydrin with at least one of bisphenol A or bisphenol F have an average epoxy functionality of two, although higher and lower functionalities may also be useful.

The polyepoxide may be liquid or solid. Whether liquid or solid, the polyepoxide may be chosen to be soluble in compositions according to the present invention. In some instances, heating may facilitate dissolution of the polyepoxide.

Examples of useful polyepoxides formed by reaction of bisphenol A or bisphenol F with epichlorohydrin include, for example, bisphenol A-epichlorohydrin derived epoxy resins, bisphenol A diglycidyl ether (commonly referred to in the art as DGEBA) and bisphenol F diglycidyl ether and commercially available epoxy resins having the trade designation "EPON" (e.g., "EPON RESIN 825", "EPON RESIN 828", "EPON RESIN 1001F", "EPON RESIN 1002F", "EPON RESIN 1004F", "EPON RESIN 1009F", and "EPON RESIN 2003"), marketed by Resolution Performance Products, Houston, Tex. and many epoxy resins having the trade designation "D.E.R." (e.g., "D.E.R. 331", "D.E.R. 332", "D.E.R. 351", "D.E.R. 352", "D.E.R. 354", and "D.E.R. 356"), marketed by Dow Chemical Company, Midland, Mich.

Additional epoxy resins may be added to the backing treatment precursor if desired.

Polyfunctional urethane (meth)acrylates have at least two (meth)acrylate groups. Examples of polyfunctional urethane (meth)acrylates, wherein homopolymerization (e.g., by photo- or thermal initiation) of the polyfunctional urethane (meth)acrylate results in a polymer having a glass transition temperature of less than 50 degrees Celsius, include monomers, oligomers, polymers, and mixtures thereof. As used herein, the term "oligomer" refers to molecule composed of a small number of linked monomer units. Oligomers generally have less than one hundred monomer units and more typically less than thirty.

Useful polyfunctional urethane (meth)acrylates include, for example, aliphatic and aromatic polyfunctional urethane (meth)acrylates.

Methods for making such polyfunctional urethane (meth)acrylates are well known in the art, and many polyfunctional urethane (meth)acrylates are commercially available. Examples include aliphatic and aromatic urethane (meth)acrylate oligomers such as those available from UCB Chemicals Corp., Smyrna, Ga., under the trade designations "EBECRYL 270", "EBECRYL 8804", "EBECRYL 8807", "EBECRYL 4827", "EBECRYL 6700", "EBECRYL 5129", or "EBECRYL 8402" and those available from Sartomer Co., Exton, Pa., under the trade designations "CN 1963", "CN 934", "CN 953B70", "CN 984", "CN 962", "CN 964", "CN 965", "CN 972", "CN 978".

Non-urethane polyfunctional (meth)acrylates include monomers, oligomer, and polymer having at least two (meth)acrylate groups. Examples of polyfunctional (meth)acrylates include ethylene glycol di(meth)acrylate, hexanediol di(meth)acrylate, triethylene glycol di(meth)acrylate, trimethylolpropane tri(meth)acrylate, glycerol tri(meth)acrylate, pentaerythritol tri(meth)acrylate, ethoxylated trimethylolpropane tri(meth)acrylate, neopentyl glycol di(meth)acrylate, pentaerythritol tetra(meth)acrylate, dipentaerythritol penta(meth)acrylate, sorbitol tri(meth)acrylate, sorbitol hexa(meth)acrylate, bisphenol A di(meth)acrylate, ethoxylated bisphenol A di(meth)acrylates, acrylated epoxy oligomers (e.g., bisphenol-A based epoxy acrylate oligomers such as, for example, those marketed under the trade designations "EBECRYL 3500", "EBECRYL 3600", "EBECRYL 3720", and "EBECRYL 3700" by UCB Radcure), and acrylated polyesters (e.g., as marketed by UCB Radcure under the trade designation "EBECRYL 870"), and mixtures thereof.

The acidic free-radically polymerizable monomer has both an acidic group and a group (e.g., a (meth)acryl group) that is free-radically polymerizable. The acidic group may be, for example, carbon-, sulfur-, or phosphorus-based, and may be the free acid or in a partially or fully neutralized state. The acidic free-radically polymerizable monomer may have more than one acidic groups and/or free-radically polymerizable groups.

Useful carbon-based acidic free-radically polymerizable monomers include, for example, (meth)acrylic acid, maleic acid, monoalkyl esters of maleic acid, fumaric acid, monoalkyl esters of fumaric acid, itaconic acid, isocrotonic acid, crotonic acid, citraconic acid, and beta-carboxyethyl acrylate.

Useful sulfur-based acidic free-radically polymerizable monomers include, for example, 2-sulfoethyl methacrylate, styrene sulfonic acid, and 2-acrylamido-2-methylpropanesulfonic acid.

Acidic, free radically polymerizable monomers are commercially available, for example, under the trade designations "PHOTOMER 4173" from Cognis Corp., Cincinnati, Ohio, and "CN118", "CD9050", "CD9051" and "CD9052" all from Sartomer Co., Exton, Pa.

Useful phosphorus-based acidic free-radically polymerizable monomers include, for example, vinyl phosphonic acid.

The backing treatment precursor typically includes an amount of dicyandiamide that is effective to at least partially polymerize (e.g., cure) the polyepoxide, for example, 0.1 to 5 percent by weight of dicyandiamide, based on the total weight of components a) through g). Dicyandiamide is widely available commercially, for example, as marketed by Air Products and Chemicals, Allentown, Pa. under the trade designations "AMICURE CG-1200" and "AMICURE CG-1400".

The photoinitiator is capable of at least partially polymerizing (e.g., curing) free-radically polymerizable components of the backing treatment precursor. For example, the photoinitiator may be present in an amount in a range of from about 0.01 percent by weight up to about 10 percent by weight, based on the total weight of components a) through g).

Useful photoinitiators include those known as useful for photocuring free-radically polyfunctional acrylates. Exemplary photoinitiators include benzoin and its derivatives such as alpha-methylbenzoin; alpha-phenylbenzoin; alpha-allylbenzoin; alpha-benzylbenzoin; benzoin ethers such as benzil dimethyl ketal (e.g., as commercially available under the trade designation "IRGACURE 651" from Ciba Specialty Chemicals, Tarrytown, N.Y.), benzoin methyl ether, benzoin ethyl ether, benzoin n-butyl ether; acetophenone and its derivatives such as 2-hydroxy-2-methyl-1-phenyl-1-propanone (e.g., as commercially available under the trade designation "DAROCUR 1173" from Ciba Specialty Chemicals) and 1-hydroxycyclohexyl phenyl ketone (e.g., as commercially available under the trade designation "IRGACURE 184" from Ciba Specialty Chemicals); 2-methyl-1-[4-(methylthio)phenyl]-2-(4-morpholinyl)-1-propanone (e.g., as commercially available under the trade designation "IRGACURE 907" from Ciba Specialty Chemicals); 2-benzyl-2-(dimethylamino)-1-[4-(4-morpholinyl)phenyl]-1-butanone (e.g., as commercially available under the trade designation "IRGACURE 369" from Ciba Specialty Chemicals).

Other useful photoinitiators include, for example, pivaloin ethyl ether, anisoin ethyl ether, anthraquinones (e.g., anthraquinone, 2-ethylanthraquinone, 1-chloroanthraquinone, 1,4-dimethylanthraquinone, 1-methoxyanthraquinone, or benzanthraquinone), halomethyltriazines, benzophenone and its derivatives, iodonium salts and sulfonium salts, titanium complexes such as bis(eta$_5$-2,4-cyclopentadien-1-yl)-bis[2,6-difluoro-3-(1H-pyrrol-1-yl)phenyl]titanium (e.g., as commercially available under the trade designation "CGI 784DC" from Ciba Specialty Chemicals); halomethyl-nitrobenzenes (e.g., 4-bromomethylnitrobenzene), mono- and bis-acylphosphines (e.g., as commercially available from Ciba Specialty Chemicals under the trade designations "IRGACURE 1700", "IRGACURE 1800", "IRGACURE 1850", and "DAROCUR 4265").

One or more spectral sensitizers (e.g., dyes) may be added to the backing treatment precursor in combination with the photoinitiator, for example, in order to increase sensitivity of the photoinitiator to a specific source of actinic radiation.

In some instances, it may be useful to include epoxy cure catalyst in the backing treatment precursor. Epoxy cure catalysts are well known and include imidazoles such as, for example, 2-ethylimidazole, and 2-ethyl-4-methylimidazole (e.g., as marketed under the trade designation "IMICURE EMI-2,4" by Air Products and Chemicals, Allentown, Pa., and 2-propylimidazole (e.g., as marketed under the trade designation "ACTIRON NXJ-60" by Synthron, Morganton, N.C.); and Lewis acid complexes such as boron trifluoride and boron trichloride complexes including, for example, $BF_3$ diethylamine and a $BCl_3$ amine complex marketed under the trade designation "OMICURE BC-120" by CVC Specialty Chemicals, Maple Shade, N.J.

Other known epoxy cure catalysts include aliphatic and aromatic tertiary amines including, for example, dimethylpropylamine, pyridine, dimethylaminopyridine, and dimethylbenzylamine.

If included, the amount of epoxy cure catalyst typically is typically in an amount of from 0.5 to 2 percent by weight, based on the total weight of components a) through g), although higher and lower amounts may also be useful.

Optionally, in some cases it may be desirable to include a polyfunctional aziridine in the backing treatment precursor.

In addition to other components, the backing treatment precursor of the present invention may contain optional additives, for example, to modify performance and/or appearance. Exemplary additives include, fillers, solvents, plasticizers, wetting agents, surfactants, pigments, coupling agents, fragrances, fibers, lubricants, thixotropic materials, antistatic agents, suspending agents, pigments, and dyes.

Typically, it is only necessary to combine the components under conditions wherein sufficient mixing occurs to prepare the backing treatment precursor. In cases wherein the components of the composition are mutually soluble, the composition may be homogeneous throughout its entirety. To facilitate mixing agitation and/or stirring may be used. In instances, of higher viscosity, the mixture may be heated to reduce its viscosity.

The application of the backing treatment precursor to the backing can be performed in a variety of ways including, for example, such techniques as brushing, spraying, roll coating, saturation coating, curtain coating, gravure coating, and knife coating. Organic solvent may be added to the backing treatment precursor to facilitate the specific coating technique used. The coated backing may then be processed for a time at a temperature sufficient to dry (if organic solvent is present) and at least partially polymerize the coating thereby securing it to the backing. For example, after an optional period of at least about 10, 20, or 30 seconds, or even longer, the backing treatment precursor is typically at least partially polymerized, for example, by any of a number of well-known techniques such as, for example, by exposure electron beam radiation, actinic radiation (i.e., ultraviolet and/or visible electromagnetic radiation), and thermal energy. If actinic radiation is used, at least one photoinitiator is typically present in the backing treatment precursor. If thermal energy is used, at least one thermal initiator is typically present in the backing treatment precursor. The polymerization may be carried out in air or in an inert atmosphere such as, for example, nitrogen or argon.

In one exemplary embodiment, the abrasive layer comprises a make layer comprising a first binder resin, abrasive particles embedded in the make layer, and a size layer comprising a second binder resin secured to the make layer and abrasive particles.

Referring to FIG. 1, exemplary coated abrasive article 100 according to the present invention has backing 110, backing treatment 120 is secured to major surface 115 of backing 110 and abrasive layer 130 secured to backing treatment 120. Abrasive layer 130, in turn, includes abrasive particles 160 secured to backing treatment 120 by make layer 140 and size layer 150 secured to make layer 140 and abrasive particles 160.

The make and size layers may comprise any binder resin that is suitable for use in abrading applications. Typically, the make layer is prepared by coating at least a portion of the backing (treated or untreated) with a make layer precursor. Abrasive particles are then at least partially embedded (e.g., by electrostatic coating) in the make layer precursor comprising a first binder precursor, and the make layer precursor is at least partially polymerized. Next, the size layer is prepared by coating at least a portion of the make layer and abrasive particles with a size layer precursor comprising a second binder precursor (which may be the same as, or different from, the first binder precursor), and at least partially curing the size layer precursor. In one embodiment, the make layer precursor may be partially polymerized prior to coating with abrasive particles and further polymerized at a later point in the manufacturing process.

In one embodiment, a supersize may be applied to at least a portion of the size layer.

Useful first and second binder precursors are well known in the abrasive art and include, for example, free-radically polymerizable monomer and/or oligomer, epoxy resins, phenolic resins, melamine-formaldehyde resins, aminoplast resins, cyanate resins, or combinations thereof.

Useful abrasive particles are well known in the abrasive art and include for example, fused aluminum oxide, heat treated aluminum oxide, white fused aluminum oxide, black silicon carbide, green silicon carbide, titanium diboride, boron carbide, tungsten carbide, titanium carbide, diamond, cubic boron nitride, garnet, fused alumina zirconia, sol gel abrasive particles, silica, iron oxide, chromia, ceria, zirconia, titania, silicates, metal carbonates (such as calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, aluminum trihydrate, graphite, metal oxides (e.g., tin oxide, calcium oxide), aluminum oxide, titanium dioxide) and metal sulfites (e.g., calcium sulfite), metal particles (e.g., tin, lead, copper), plastic abrasive particles formed from a thermoplastic material (e.g., polycarbonate, polyetherimide, polyester, polyethylene, polysulfone, polystyrene, acrylonitrile-butadiene-styrene block copolymer, polypropylene, acetal polymers, polyvinyl chloride, polyurethanes, nylon), plastic abrasive particles formed from crosslinked polymers (e.g., phenolic resins, aminoplast resins, urethane resins, epoxy resins, melamine-formaldehyde, acrylate resins, acrylated isocyanurate resins, urea-formaldehyde resins, isocyanurate resins, acrylated urethane resins, acrylated epoxy resins), and combinations thereof. Useful abrasive particles also include abrasive agglomerates which have abrasive grains dispersed in a binder resin as described, for example, in U.S. Pat. No. 4,652,275 (Bloecher et al.); U.S. Pat. No. 4,799,939 (Bloecher et al.); and U.S. Pat. No. 5,039,311 (Bloecher).

Figure 2:
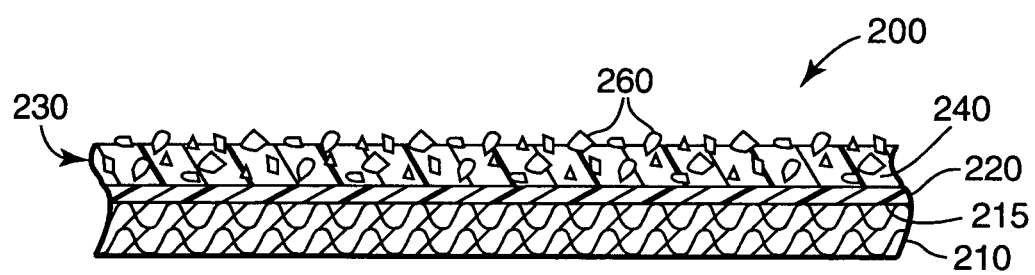
FIG. 2 is a cross-sectional view of another exemplary coated abrasive article.

In another exemplary embodiment of a coated abrasive article according to the present invention, the abrasive layer comprises abrasive particles dispersed in a binder. Referring now to FIG. 2, exemplary coated abrasive article 200 has backing 210, backing treatment 220 secured to major surface 215 of backing 210, and abrasive layer 230 secured to backing treatment 220. Abrasive layer 230 includes abrasive particles 260 dispersed in binder 240.

In making such a coated abrasive article, a slurry comprising a binder precursor and abrasive particles is typically applied to a major surface of the backing, and the binder precursor is then at least partially cured. Suitable binder precursors and abrasive particles include, for example, those listed hereinabove.

Figure 3:
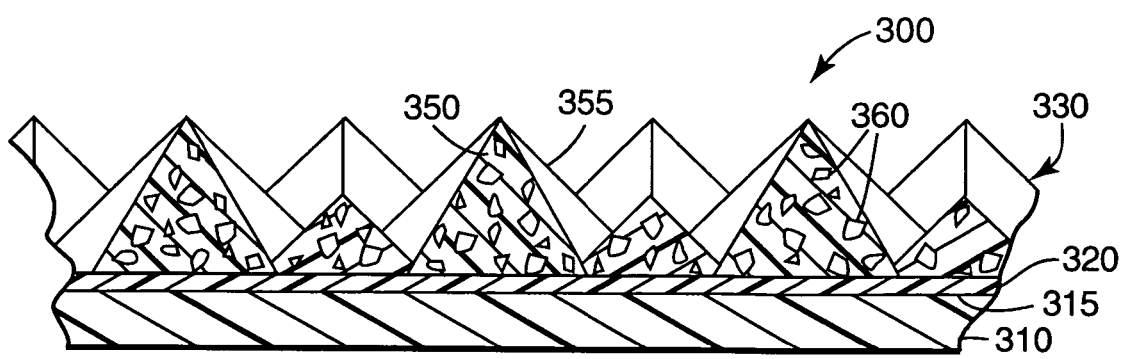
FIG. 3 is a cross-sectional view of another exemplary coated abrasive article.

In another exemplary embodiment, a coated abrasive article according to the present invention may comprise a structured abrasive article. Referring now to FIG. 3, exemplary structured abrasive article 300 has backing 310, backing treatment 320 according to the present invention secured to major surface 315 of backing 310, and abrasive layer 330 secured to backing treatment 320. Abrasive layer 330 includes a plurality of precisely-shaped abrasive composites 355. The abrasive composites comprise abrasive particles 360 dispersed in binder 350.

In making such a coated abrasive article, a slurry comprising a binder precursor and abrasive particles may be applied to a tool having a plurality of precisely-shaped cavities therein, thereby urging the slurry into at least a portion of the cavities. The slurry is then at least partially polymerized and adhered to the tie layer, for example, by adhesive or addition polymerization of the slurry. Suitable binder precursors and abrasive particles include, for example, those listed hereinabove.

The abrasive composites may have a variety of shapes including, for example, those shapes selected from the group consisting of cubic, block-like, cylindrical, prismatic, pyramidal, truncated pyramidal, conical, truncated conical, cross-shaped, and hemispherical. The abrasive composites may be precisely shaped or not.

Further details concerning structured abrasives and methods for making them may be found, for example, in U.S. Pat. No. 5,152,917 (Pieper et al.); U.S. Pat. No. 5,855,632 (Stoetzel et al.); U.S. Pat. No. 5,681,217 (Hoopman et al.); U.S. Pat. No. 5,435,816 (Spurgeon et al.); U.S. Pat. No. 5,378,251 (Culler et al.); U.S. Pat. No. 5,304,223 (Pieper et al.); and U.S. Pat. No. 5,014,468 (Ravipati et al.), the disclosures of which are incorporated herein by reference.

Optionally, coated abrasive articles may further comprise, for example, a backsize, a presize and/or subsize (i.e., a coating between the tie layer and the major surface to which the tie layer is secured), and/or a saturant that coats both major surfaces of the backing. Coated abrasive articles may further comprise a supersize covering at least a portion of the abrasive coat. If present, the supersize typically includes grinding aids and/or anti-loading materials.

Coated abrasive articles according to the present invention may be converted, for example, into belts, rolls, discs (including perforated discs), and/or sheets. For belt applications, two free ends of the abrasive sheet may be joined together using known methods to form a spliced belt.

Further description of techniques and materials for making coated abrasive articles may be found in, for example, U.S. Pat. No. 4,314,827 (Leitheiser et al.); U.S. Pat. No. 4,518,397 (Leitheiser et al.); U.S. Pat. No. 4,588,419 (Caul et al.); U.S. Pat. No. 4,623,364 (Cottringer et al.); U.S. Pat. No. 4,652,275 (Bloecher et al.); U.S. Pat. No. 4,734,104 (Broberg); U.S. Pat. No. 4,737,163 (Larkey); U.S. Pat. No. 4,744,802 (Schwabel); U.S. Pat. No. 4,751,138 (Tumey et al.); U.S. Pat. No. 4,770,671 (Monroe et al.); U.S. Pat. No. 4,799,939 (Bloecher et al.); U.S. Pat. No. 4,881,951 (Wood et al.); U.S. Pat. No. 4,927,431 (Buchanan et al.); U.S. Pat. No. 5,498,269 (Larmie); U.S. Pat. No. 5,011,508 (Wald et al.); U.S. Pat. No. 5,078,753 (Broberg et al.); U.S. Pat. No. 5,090,968 (Pellow); U.S. Pat. No. 5,108,463 (Buchanan et al.); U.S. Pat. No. 5,137,542 (Buchanan et al.); U.S. Pat. No. 5,139,978 (Wood); U.S. Pat. No. 5,152,917 (Pieper et al.); U.S. Pat. No. 5,201,916 (Berg et al.); U.S. Pat. No. 5,203,884 (Buchanan et al.); U.S. Pat. No. 5,227,104 (Bauer); U.S. Pat. No. 5,304,223 (Pieper et al.); U.S. Pat. No. 5,328,716 (Buchanan); U.S. Pat. No. 5,366,523 (Rowenhorst et al.); U.S. Pat. No. 5,378,251 (Culler et al.); U.S. Pat. No. 5,417,726 (Stout et al.); U.S. Pat. No. 5,429,647 (Larmie); U.S. Pat. No. 5,436,063 (Follett et al.); U.S. Pat. No. 5,490,878 (Peterson et al.); U.S. Pat. No. 5,492,550 (Krishnan et al.); U.S. Pat. No. 5,496,386 (Broberg et al.); U.S. Pat. No. 5,520,711 (Helmin); U.S. Pat. No. 5,549,962 (Holmes et al.); U.S. Pat. No. 5,551,963 (Larmie); U.S. Pat. No. 5,556,437 (Lee et al.); U.S. Pat. No. 5,560,753 (Buchanan et al.); U.S. Pat. No. 5,573,619 (Benedict et al.); U.S. Pat. No. 5,609,706 (Benedict et al.); U.S. Pat. No. 5,672,186 (Chesley et al.); U.S. Pat. No. 5,700,302 (Stoetzel et al.); U.S. Pat. No. 5,851,247 (Stoetzel et al.); U.S. Pat. No. 5,913,716 (Mucci et al.); U.S. Pat. No. 5,942,015 (Culler et al.); U.S. Pat. No. 5,954,844 (Law et al.); U.S. Pat. No. 5,961,674 (Gagliardi et al.); U.S. Pat. No. 5,975,988 (Christianson);

U.S. Pat. No. 6,059,850 (Lise et al.); and U.S. Pat. No. 6,261,682 (Law), the disclosures of which are incorporated herein by reference.

Abrasive articles according to the present invention are useful for abrading a workpiece in a process wherein at least a portion of the abrasive layer of a coated abrasive article is frictionally contacted with the abrasive layer with at least a portion of a surface of the workpiece, and then at least one of the coated abrasive article or the workpiece is moved relative to the other to abrade at least a portion of the surface. The abrading process may be carried out, for example, by hand or by machine. Optionally, liquid (e.g., water, oil) and/or surfactant (e.g., soap, nonionic surfactant) may be applied to the workpiece, for example, to facilitate the abrading process.

Objects and advantages of this invention are further illustrated by the following non-limiting examples, but the particular materials and amounts thereof recited in these examples, as well as other conditions and, details, should not be construed to unduly limit this invention.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

"ADHCUR1": modified polyamide amine, commercially available under the trade designation "VERSAMIDE 125" from Cognis Corp., Cincinnati, Ohio;

"ADHCUR2": modified aliphatic amine, commercially available under the trade designation "ANCAMINE AD CURING AGENT" from Air Products and Chemicals, Allentown, Pa.;

"AFR1": acidic aromatic acrylate oligomer, commercially available under the trade designation "PHOTOMER 4173" from Cognis Corp.;

"AZ1": polyfunctional aziridine commercially available under the trade designation from "HYDROFLEX XR-2990" from H.B. Fuller Company, Vadnais Heights, Minn.;

"ACR1": acrylated aliphatic urethane, obtained under the trade designation "EBECRYL 8402" from UCB Radcure, Smyrna, Ga.;

"ACR2": Triethylene glycol dimethacrylate, obtained under the trade designation "SR205" from Sartomer Company, Exton, Pa.;

"ACR3": trimethylolpropane triacrylate, obtained under the trade designation "TMPTA-N" from UCB Radcure;

"ACR4": trimethylolpropane triacrylate obtained under the trade designation "SR351" from Sartomer Company, Exton, Pa.;

"DICY": dicyandiamide (having an average particle size of less than 10 micrometers), obtained under the trade designation "AMICURE CG-1400" from Air Products and Chemicals;

"CPA1": a silane coupling agent, obtained under the trade designation "SILANE A-174NT" from GE-Silicones, Friendly, W.Va.;

"CUR1":2-propylimidazole, obtained under the trade designation "ACTIRON NXJ-60 LIQUID" from Synthron, Inc., Morganton, N.C.;

"EP1": bisphenol A epoxy functional material, obtained under the trade designation "EPON 828" from Resolution Performance Products, Houston, Tex.;

"FIL1": calcium metasilicate, obtained under the trade designation "400 WOLLASTACOAT" from NYCO Minerals Inc., Willsboro, N.Y.:

"FIL2": calcium carbonate, obtained under the trade designation "Q325" from J.M. Huber Corporation, Atlanta, Ga.;

"GC1": a greige cloth consisting of a 100% polyester sateen fabric from open-end spun yarns weighing 326 g/m$^2$, commercially available under trade designation "POWER-STRAIGHT" from Milliken and Co.;

"LA1": a polyamide hot melt laminating adhesive, obtained under the trade designation "JET MELT BRAND ADHESIVE PG3779" from 3M Company;

"LA2": a laminating adhesive prepared as follows: A 237 ml glass jar was charged with 100 g EP1, 28 g ADHCUR1, 5 g ADHCUR2 and 80 g FIL1, and then mixed with low shear mixer until homogenous;

"LT1": a latex material, obtained under the trade designation "HYCAR 1581" from Noveon, Inc., Cleveland, Ohio;

"MIN1": JIS grade 400 abrasive mineral, obtained under the trade designation "3M CUBITRON ABRASIVE GRAIN 321" from 3M Company;

"MIN2": ANSI grade 80 abrasive mineral, obtained under the trade designation "3M CUBITRON ABRASIVE GRAIN 321" from 3M Company;

"OX 50": amorphous silica, obtained under the trade designation "AEROSIL OX 50" from Degussa Corporation, Vernon, Ill.;

"NOV1": novolac resin, obtained under the trade designation "RUTAPHEN 8656F" from Bakelite AG, Frielendorf, Germany;

"PI1": 2,2-dimethoxy-2-phenylacetophenone, obtained under trade designation "IRGACURE 651" from Ciba Specialty Chemicals, Hawthorne, N.Y.;

"PI2": 2-benzyl-2-(dimethylamino)-1-[4-(4-morpholinyl)phenyl]-1-butanone obtained under the trade designation "IRGACURE 369" from Ciba Specialty Chemicals Stripback Adhesion Test A wooden board with dimensions 17.8 cm×7.6 cm×6 mm was coated with laminating compositions LA1 or LA2 as follows.

If LA1 was used, it was dispensed using a hot melt adhesive glue gun. A 15 cm section of a 25 cm×8 cm strip of the coated abrasive to be tested was partially overlaid onto the molten laminating adhesive with the abrasive side facing the laminating adhesive. The abrasive strip was then pressed into position and then the assembly was cooled to 25° C.

If LA2 was used, a 15 cm section of a 25 cm×8 cm strip of the coated abrasive to be tested, with abrasive side also coated with laminating adhesive (in addition to the board), was partially overlaid onto the laminating adhesive with the abrasive side facing the board. The abrasive strip was then pressed into position, and cure at 25° C. for 12 hours and finally at 50° C. for 4 hours.

The wooden board was mounted horizontally into the upper jaws of a tensile testing machine, obtained under the trade designation "SINTECH 6W" from MTS Systems Corporation, Eden Prairie, Minn. The free end of the coated abrasive was then attached to the lower jaws of the tensile tester and, at a rate of 0.5 mm/second, the lower jaws pulled the coated abrasive from the wooden board at an angle of 90 degrees. The force, expressed in Newtons per centimeter (N/cm) of specimen width, necessary to cause failure of the test specimen was reported.

Resin Preparation

Abrasive Slurry 1 (AS1)

An abrasive slurry was prepared by adding the following components, in the order listed, to a 5 gallon (18 liter) pail: 9583 g of ACR, 8696 g of PI2, 8688 g of FIL1, 372 g of CPA1, 87 g of OX 50, 11172 g of MIN1. The slurry was mixed for one hour at 1250 rpm using a high shear mixer (model PHR-2A) available from Scott Turbon Mixer, Inc., Adelanto, Calif. until the slurry temperature reached 80° F. (26.7° C.).

Abrasive Slurry 2 (AS2)

An abrasive slurry was prepared by adding the following components, in the order listed, to a 5 gallon (18 liter) pail: 5932 g of ACR4, 60 g of PI2, 5817 g of FIL1, 290 g of CPA1, 290 g of OX 50, and 12610 g of MIN2. The slurry was mixed for one hour at 1250 rpm using a high shear mixer (model PHR-2A) available from Scott Turbon Mixer, Inc., until the slurry temperature reached 80° F. (26.7° C.).

Backsize Resin 1 (BSR1)

BSR1 was prepared by mechanically stirring until homogeneous, at 20° C., 450 g FIL2 and 15 g RIO into 285 g of a phenol-formaldehyde resin having a phenol to formaldehyde ratio of 1.5-2.1/1, catalyzed with 2.5 percent by weight sodium hydroxide. The mixture was then diluted to one kilogram with water.

Backsize Resin 2 (BSR2)

BSR2 was prepared by mechanically stirring until homogeneous, at 20° C., 420 g FIL2, 15 g RIO and 180 g LT1 into 120 g of a phenol-formaldehyde resin having a phenol to formaldehyde ratio of 1.5-2.1/1, catalyzed with 2.5 percent by weight sodium hydroxide. The mixture was then diluted to one kilogram with water.

Cloth Saturating Resin 1 (CSR1)

CSR1 was prepared by mechanically stirring until homogeneous, at 20° C., 100 g LT1 into 120 g of a phenol-formaldehyde resin having a phenol to formaldehyde ratio of 1.5-2.1/1, catalyzed with 2.5 percent by weight sodium hydroxide. The mixture was then diluted to one kilogram with water.

Cloth Treating Resin 1 (CTR1)

ACR1 (80.35 g), 0.674 g of PI1 and 9.09g of EP1 were added to an 8-ounce (236.6 milliliters) glass jar and manually mixed at 20° C. until homogeneous. The jar was then placed in an oven set at 60° C. for 30 minutes. The jar was removed from the oven and the following components added and manually mixed until homogeneous: 4.50 g of AFR1, 4.50 g of ACR2, and 0.8 g of DICY. Just prior to coating, 0.099 g of CUR1 was added and manually mixed until homogeneous.

Cloth Treating Resin 2 (CTR2)

CTR2 was prepared by mechanically mixing at 20° C., 11306 g EP1 and 151 g PI1in a 5-gallon (19-liter) pail. The pail was then placed in an oven for 30 minutes at 70° C. The pail was removed from the oven and 754 g of NOV1 and 1206 g of DICY to added to the pail and mixed until homogeneous. Finally, 114 g of CUR1 was mixed into the composition just prior to coating the resin.

Cloth Treating Resin 3 (CTR3)

CTR3 was prepared by mechanically mixing at 20° C., 13650 g of ACR1 and 150 g of PI1 in a 5-gallon (18-liter) pail. The pail was then placed in an oven for 4 hours at 60° C. The pail was removed from the oven and 150 g of AFR1 and 750 g of AZ1 to added to the pail and mixed until homogeneous prior to coating.

Backing Treatment

Treated Cloth 1 (TC1)

Cloth Treating Resin CTR1 was applied to the front side of a 12 inch (30 cm) wide web greige cloth GC1 using a floating coating knife. The wet add on weight was 150 g/m$^2$. The treated cloth was then irradiated with an ultraviolet (UV) lamp, type "D" bulb, from Fusion Systems Inc., at 7.6 m/min and 118 Watts/cm$^2$ (118 J/cm$^2$-sec), and then thermally cured by heating in a tunnel oven at 60° C. for 3 minutes. Backsize resin BSR1 was then roll coated on the opposite side of the cloth (back side) at wet add on weight of 125 g/m$^2$, after which the resin was thermally cured in sequential 3-minute intervals at 90° C., 110° C. and 120° C.

Treated Cloth 2 (TC2)

Treated Cloth 2 was prepared according to the method used in the preparation of TC1, except that the sequence of cloth treating steps was BSR1 applied first, followed by CTR1 which had a wet add on weight of 190 g/m$^2$, and there was no thermal cure.

Comparative Treated Cloth A (CTCA)

Cloth Treating Resin CTR2 was applied to the front side of a 12 inch (30 cm) wide web greige cloth GC1 using a floating coating knife. The wet add on weight was 113 g/m$^2$. The treated cloth was then irradiated with an ultraviolet (UV) lamp, type "D" bulb, from Fusion Systems Inc., at 7.6 m/min and 118 Watts/cm$^2$ (118 J/cm$^2$-sec), and then thermally cured by heating in a tunnel oven at 170° C. for 1 minute and then at 160° C. for 2 minutes. A tie coat of CTR3 was applied over the cured CTR2 coating using the same coating and irradiating procedures as for the front side, then thermally cured by heating in a tunnel oven at 120° C. for 3 minutes. Backsize resin BSR1 was then roll coated on the opposite side of the cloth (back side) at wet add on weight of 125 g/m$^2$, after which the resin was thermally cured in sequential 3-minute intervals at 90° C., 110° C. and 120° C.

Comparative Treated Cloth B (CTCB)

Comparative Treated Cloth B was prepared by saturating GC1 with about 100 g/m$^2$ CSR1 and was subsequently backsized with a target weight of 100 g/m$^2$ BSR2 as in the preparation of CTCA. The backing was then pre-sized with LT1 at a wet add on weight of 25 g/m$^2$. Finally, the backing was tie coated with a target weight of 19 g/m$^2$ ACR4.

Comparative Treated Cloth C (CTCC)

Cloth Treating Resin CTR3 was applied to the front side of a 12 inch (30 cm) wide web greige cloth GC1 using a floating coating knife. The wet add on weight was 113 g/m$^2$. The treated cloth was then irradiated with an ultraviolet (UV) lamp, type "D" bulb, from Fusion Systems Inc., at 7.6 m/min and 118 Watts/cm$^2$ (118 J/cm$^2$-sec), and then thermally cured by heating in a tunnel oven at 120° C. for 3 minutes. Backsize resin BSR1 was then roll coated on the opposite side of the cloth (back side) at wet add on weight of 125 g/m$^2$, after which the resin was thermally cured in sequential 3-minute intervals at 90° C., 110° C. and 120° C.

Comparative Treated Cloth D (CTCD)

Comparative Treated Cloth D was made according to the preparation of CTCC, with the exception that BSR1 was replaced with BSR2.

Coated Abrasive Articles

Coated Abrasive 1 (CA1)

Coated Abrasive 1 was prepared according to the method described in paragraphs 0083 and 0084 of U.S. Pat. Publ. No. 2005/0060947A1 (McArdle et al.), the disclosure of which is incorporated herein by reference. A transparent polypropylene tool was provided. The tool had a plurality of precisely-shaped, square-based pyramidal-type cavities 65 mil (1.65 millimeter) square by 30 mil (0.76 millimeters) deep, and the pyramidal-type cavities were placed such that their bases were butted up against one another. Abrasive Slurry AS1 was knife-coated onto backing TC1 at a coating thickness of 25 mils (0.64 millimeter) and a coating width of approximately 9 inches (22.9 cm). The slurry-coated backing was brought into contact with the cavities of the transparent polypropylene tool under a nip roll pressure of 60 lbs/in$^2$ (414 kPa), and the slurry was then irradiated using two lamps ("D" bulbs, commercially available from Fusion Corp.) operating at 600 Watts/in$^2$ (118 Watts/cm$^2$). The coating process operated at approximately 50 feet/minute (15 meters/minute). After the abrasive was removed from the coating apparatus, the abrasive was heated in an oven at 240° F. (115° C.) for 24 hours.

Coated Abrasive 2 (CA2)

Coated Abrasive 2 was prepared according to the procedure for making CA1, except that AS1 was replaced with AS2, the slurry knife-coating thickness was 32 mils (0.81 millimeter), the coating process speed was 20 feet/minute (6 m/min) and the nip roll pressure was 90 lb/in$^2$ (620 kPa).

Coated Abrasive 3 (CA3)

Coated Abrasive 3 was prepared according to the procedure for making CA1, except TC1 was replaced with TC2.

Coated Abrasive 4 (CA4)

Coated Abrasive 4 was prepared according to the procedure for making CA2, except TC1 was replaced with TC2.

Comparative Coated Abrasive E (CCAE)

Comparative Coated Abrasive E was prepared according to the procedure for making CA1, except TC1 was replaced with CTCA.

Comparative Coated Abrasive F (CCAF)

Comparative Coated Abrasive F was prepared according to the procedure for making CA2, except TC1 was replaced with CTCA, and the coating process was operated at 50 feet/minute (15 m/min).

Comparative Coated Abrasive G (CCAG)

Comparative Coated Abrasive G was prepared according to the procedure for making CCAE, except CTCA was replaced with CTCB.

Comparative Coated Abrasive H (CCAH)

Comparative Coated Abrasive H was prepared according to the procedure for making CCAF, except CTCA was replaced with CTCB.

Comparative Coated Abrasive I (CCAI)

Comparative Coated Abrasive I was prepared according to the procedure for making CCAE, except CTCA was replaced with CTCC.

Comparative Coated Abrasive J (CCAJ)

Comparative Coated Abrasive J was prepared according to the procedure for making CCAJ, except CTCC was replaced with CTCD.

Stripback Adhesion tests were performed on the precisely-shaped coated abrasive articles according to the method described above. Results are reported in Table 1 (below).

TABLE 1

| COATED ABRASIVE | ABRASIVE SLURRY | TREATED CLOTH | STRIPBACK LAMINATING ADHESIVE | AVERAGE STRIPBACK, lb/inch, (N/cm) |
|---|---|---|---|---|
| CA1 | AS1 | TC1 | LA2 | 33.0 (3.72) |
| CA2 | AS2 | TC1 | LA2 | 25.6 (2.89) |
| CA3 | AS1 | TC2 | LA2 | 38.8 (4.38) |
| CA4 | AS2 | TC2 | LA2 | 36.8 (4.15) |
| CCAE | AS1 | CTCA | LA1 | 7.6 (0.86) |
| CCAF | AS2 | CTCA | LA1 | 3.6 (0.41) |
| CCAG | AS1 | CTCB | LA2 | 20.1 (2.27) |
| CCAH | AS2 | CTCB | LA2 | 14.1 (1.59) |
| CCAI | AS2 | CTCC | LA2 | 18.0 (2.03) |
| CCAJ | AS2 | CTCD | LA2 | 14.65 (1.65) |

Various modifications and alterations of this invention may be made by those skilled in the art without departing from the scope and spirit of this invention, and it should be understood that this invention is not to be unduly limited to the illustrative embodiments set forth herein.

What is claimed is:

1. A coated abrasive article comprising a backing having a major surface, a backing treatment secured to at least a portion of the major surface, an abrasive layer secured to at least a portion of the backing treatment, the abrasive layer comprising abrasive particles and a binder resin, wherein the backing treatment is preparable by at least partially polymerizing an isotropic backing treatment precursor comprising, based on the total weight of components a) to g):

a) from 1 to 12 percent of at least one polyepoxide preparable by reaction of epichlorohydrin with at least one of bisphenol A or bisphenol F;
   b) from 70 to 90 percent of at least one polyfunctional urethane (meth)acrylate, wherein homopolymerization of the polyfunctional urethane (meth)acrylate results in a polymer having a glass transition temperature of less than 50 degrees Celsius;
   c) from 1 to 10 percent of at least one non-urethane polyfunctional (meth)acrylate;
   d) from 1 to 10 percent of at least one acidic free-radically polymerizable monomer;
   e) dicyandiamide;
   f) photoinitiator; and
   g) optional epoxy cure catalyst.

2. A coated abrasive article according to claim 1, wherein the isotropic backing treatment precursor further comprises a curative for the polyepoxide.

3. A coated abrasive article according to claim 1, wherein the acidic free-radically polymerizable monomer is selected from the group consisting of (meth)acrylic acid, maleic acid, monoalkyl esters of maleic acid, fumaric acid, monoalkyl esters of fumaric acid, itaconic acid, isocrotonic acid, crotonic acid, citraconic acid, and beta-carboxyethyl acrylate, 2-sulfoethyl methacrylate, styrene sulfonic acid, and 2-acrylamido-2-methylpropanesulfonic acid, vinyl phosphonic acid, and combinations thereof.

4. A coated abrasive article according to claim 1, wherein the abrasive layer comprises a make layer comprising a first binder resin, wherein the abrasive particles are embedded in the make layer, and a size layer comprising a second binder resin secured to the make layer and the abrasive particles.

5. A coated abrasive article according to claim 4, wherein the abrasive layer further comprises a supersize layer.

6. A coated abrasive article according to claim 1, wherein the backing comprises a treated backing comprising at least one treatment selected from the group consisting of a presize, a backsize, a subsize, and a saturant.

7. A method of abrading a workpiece comprising method of abrading a workpiece comprising:
providing a coated abrasive article according to claim 1;
frictionally contacting at least a portion of the abrasive layer with at least a portion of a surface of the workpiece; and
moving at least one of the coated abrasive article or the workpiece relative to the other to abrade at least a portion of the surface.

8. A coated abrasive article according to claim 1, wherein the abrasive particles are dispersed in the binder resin.

9. A coated abrasive article according to claim 8, wherein the abrasive layer comprises abrasive composites.

10. A coated abrasive article according to claim 8, wherein the abrasive layer comprises precisely-shaped abrasive composites.

11. A coated abrasive article according to claim 8, wherein the backing comprises polymeric film.

12. A method of making a coated abrasive article comprising disposing a backing treatment precursor on at least a portion of a backing, the backing treatment precursor comprising, based on the total weight of components a) to g):
a) from 1 to 12 percent of at least one polyepoxide preparable by reaction of epichlorohydrin with at least one of bisphenol A or bisphenol F;
b) from 70 to 90 percent of at least one polyfunctional urethane (meth)acrylate, wherein homopolymerization of the polyfunctional urethane (meth)acrylate results in a polymer having a glass transition temperature of less than 50 degrees Celsius;
c) from 1 to 10 percent of at least one non-urethane polyfunctional (meth)acrylate;
d) from 1 to 10 percent of at least one acidic free-radically polymerizable monomer;
e) dicyandiamide;
f) photoinitiator; and
g) optional epoxy cure catalyst; and
at least partially polymerizing the backing treatment precursor;
disposing a polymerizable make resin precursor on the at least partially polymerized backing treatment precursor;
at least partially embedding abrasive particles in the make resin precursor; and
at least partially polymerizing the make resin precursor.

13. A method according to claim 12, further comprising:
disposing a polymerizable size resin precursor on at least a portion of the at least partially polymerized make resin and abrasive particles; and
at least partially polymerizing the size resin precursor.

14. A method according to claim 12, wherein the backing is a treated backing having at least one treatment secured thereto selected from the group consisting of a presize, a backsize, a sub-size, and a saturant.

15. A method of making a coated abrasive article comprising:
disposing a backing treatment precursor on at least a portion of a backing, the backing treatment precursor comprising, based on the total weight of components a) to g):
a) from 1 to 12 percent of at least one polyepoxide preparable by reaction of epichlorohydrin with at least one of bisphenol A or bisphenol F;
b) from 70 to 90 percent of at least one polyfunctional urethane (meth)acrylate, wherein homopolymerization of the polyfunctional urethane (meth)acrylate results in a polymer having a glass transition temperature of less than 50 degrees Celsius;
c) from 1 to 10 percent of at least one non-urethane polyfunctional (meth)acrylate;
d) from 1 to 10 percent of at least one acidic free-radically polymerizable monomer;
e) dicyandiamide;
f) photoinitiator; and
g) optional epoxy cure catalyst;
at least partially polymerizing the backing treatment precursor;
disposing a slurry comprising polymerizable binder precursor and abrasive particles on the at least partially polymerized backing treatment precursor; and
at least partially polymerizing the binder precursor.

16. A method according to claim 15, wherein the backing is a treated backing having at least one treatment secured thereto selected from the group consisting of a presize, a backsize, a sub-size, and a saturant.

17. A method according to claim 15, further comprising providing a tool having a surface with a plurality of precisely-shaped cavities therein, and urging the slurry into at least a portion of the cavities.

* * * * *